United States Patent [19]

Chandra et al.

[11] Patent Number: 4,548,502
[45] Date of Patent: Oct. 22, 1985

[54] ULTRA-HIGH SENSITIVITY INTERFEROMETER

[75] Inventor: Suresh Chandra, Falls Church; Robert S. Rohde, Alexandria, both of Va.

[73] Assignee: The United States of America as represented by the Secretary of the Army, Washington, D.C.

[21] Appl. No.: 683,960

[22] Filed: Dec. 20, 1984

Related U.S. Application Data

[63] Continuation of Ser. No. 398,179, Jul. 14, 1982, abandoned.

[51] Int. Cl.$^4$ .............................................. G01B 9/02
[52] U.S. Cl. .................................... 356/358; 356/363
[58] Field of Search ................ 356/345, 357, 358, 363

[56] References Cited

U.S. PATENT DOCUMENTS 3,976,379 8/1976 Morokuma ..................... 356/357 X

OTHER PUBLICATIONS

Sergeev, "On the Possibility of Changing the Value of an Interference...", *Sou. J. Opt. Tech.*, vol. 44, No. 2, pp. 109–110, 2/77.

Chandra et al., "Ultrasensitive Multiple-Reflections Interferometer", *Applied Optics*, vol. 21, No. 9, pp. 1533–1535, May 1982.

*Primary Examiner*—Davis L. Willis
*Assistant Examiner*—Matthew W. Koren
*Attorney, Agent, or Firm*—Anthony T. Lane; Robert P. Gibson; Max L. Harwell

[57] ABSTRACT

A multiple reflections interferometer (MRI) which eliminates the normal angle of incidence requirement of other interferometers, such as the standard Michelson interferometer (SMI), and allows convenient choices of interferometric sensitivities, such as exactly 100 nanometers per cycle or 10 nanometers per cycle using a helium-neon laser. The MRI has the mirror that usually receives the normal incidence beam replaced by a two-mirror wedge produce multiple reflections therein to provide greater displacement sensitivities.

4 Claims, 6 Drawing Figures

ULTRA-HIGH SENSITIVITY INTERFEROMETER

The invention herein described was derived in the course of U.S. Government Contract with the Department of the Army.

This application is a continuation of application Ser. No. 398,179, filed July 14, 1982, now abandoned.

BACKGROUND OF THE INVENTION

1. Field of the Invention

The invention is a multiple reflections interferometer having two cooperative mirrors that form an effective wedge, to increase the displacement sensitivity.

2. Description of the Prior Art

The most common instrument for measuring small mechanical motions and vacuum deposit coatings has been the Michelson interferometer which produces one cycle of signal change for a movement or optical thickness change of $\lambda/2$ where $\lambda$ is the wavelength of the laser being used as the light source. In this type interferometer, one of its two mirrors remains fixed while the other mirror undergoes movements, or displacements. As the mirror moves, the interference signals go through several cycles of intensity. The mirror displacement is determined simply by counting the number of detected output cycles. By using the Standard Michelson Interferometer (SMI), the cycle counting technique does not work for displacements less than approximately $\lambda/4$, which produces an output at the detector of one-half of a cycle. Further, cycle counting accuracies are typically limited to about one-tenth count which restricts the accuracy to about $\lambda/20$ mirror displacement.

SUMMARY OF THE INVENTION

The present multiple reflections interferometer (MRI) has a several fold improvement in displacement sensitivities over the SMI. The MRI is preferably a three mirror interferometer in which one fixed mirror is offset from a beam splitter at a fixed optical path length and a two-mirror system that forms an effective wedge in optical alignment with a laser and the beam splitter wherein the two-mirror system provides a changing optical path length. The two-mirror wedge is comprised of one moving mirror and one fixed mirror positioned with respect to each other to form a wedges that incident light from a coherent light source, such as a heluim-neon laser, passing through the beam splitter strikes one of the mirrors, or the primary mirror, at a slight angle so that the beam is reflected to the secondary mirror and travels a path between the two mirrors. The beam suffers multiple reflections within the wedge before becoming normal to one of the mirror surfaces and then exits back out of the wedge and toward the beam splitter and laser. The exact return of the beam back on itself is controlled by adjusting the tilt of the secondary mirror with respect to the primary mirror. The same tilt adjustment is used to control the number of beam reflections within the wedge. The primary mirror may be considered the moving mirror and the secondary mirror the fixed mirror for explanation herein, but is not limited thereto. Any movement by the moving mirror is amplified by the multiple reflections in the two-mirror wedge. Becsuse of the multiple beam reflections in the wedge the observed Doppler frequency shift of the laser due to the mirror motion was amplified by a factor equal to the number of reflections in the wedge.

Some of the contemplated uses for the MRI are as an ultra-sensitive vibration monitor, a high resolution displacement monitor, a high precision thickness monitor for vacuum deposited coating, a high frequency beam modulators, or a sensitive angular movement monitor.

DETAILED DESCRIPTION OF THE PREFERRED EMBODIMENT

Figure 1:
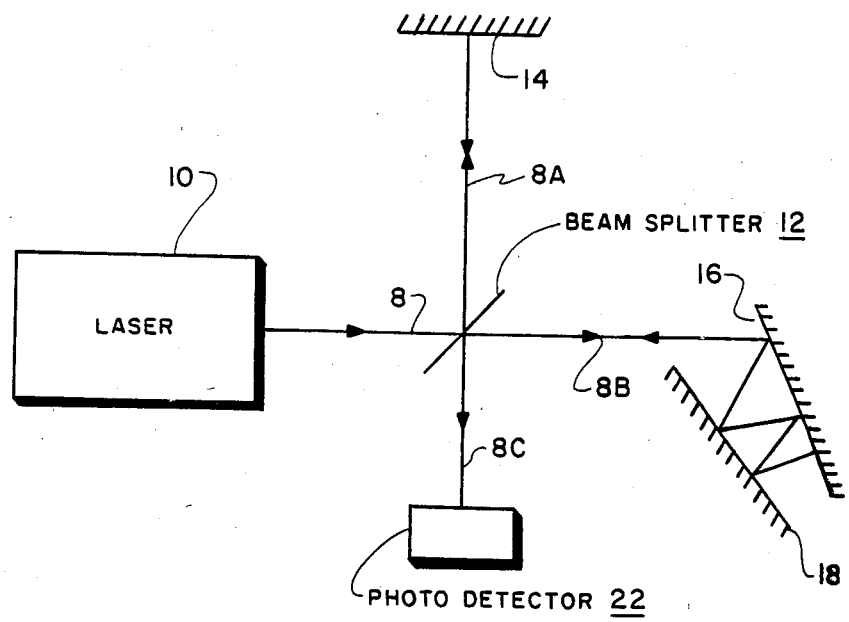
FIG. 1 illustrates a schematic of the present multiple reflections interferometer arrangement.
Figure 2:
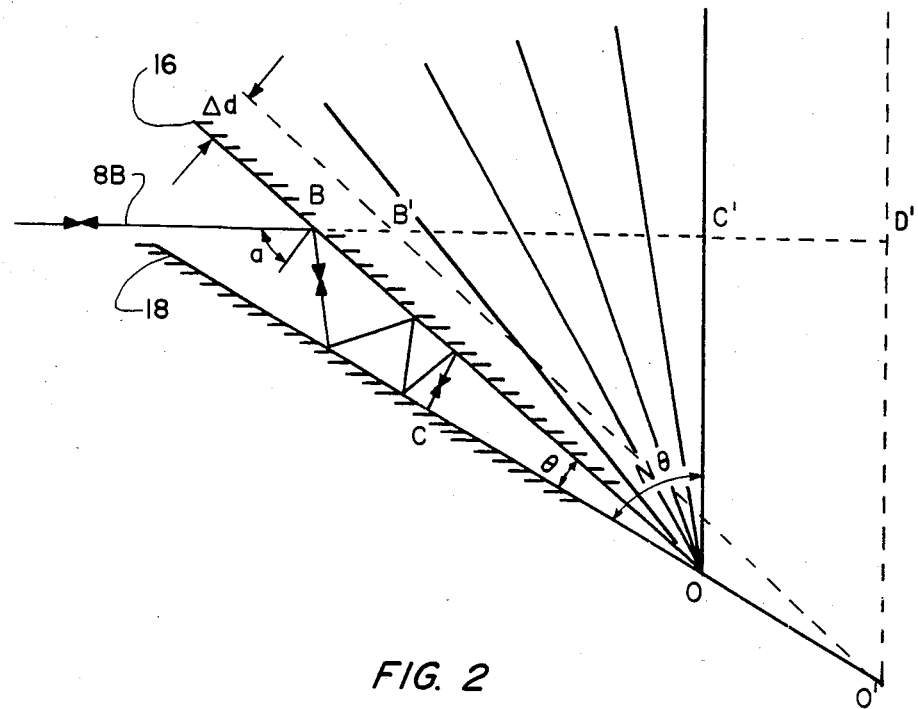
FIG. 2 shows a schematic diagram of the two-mirror wedge and beam movements therein.

The present embodiment is illustrated schematically in FIGS. 1 and 2 wherein FIG. 2 more closely shows the two mirror wedge in which incident beam 8B strikes mirror 16, herein referred to as the moving mirror, at a small angle of incidence $\alpha$ so as to be reflected off to mirror 18, herein referred to as the fixed mirror. Mirror 18 is held fixed at a tilt, or wedge angle $\theta$, with respect to moving mirror 16 wherein mirrors 16 and 18 geometrically converge to an origin point O, even though the mirrors do not physically meet. Mirrors 16 and 18 cause the incident beam 8B to suffer multiple reflections within the two-mirror wedge until the beam becomes normal to one of the two mirrors at a point, represented as point C, at which point beam 8B has an exact path return back out of the two-mirror wedge. The tilt adjustment of mirrors 18 with respect to mirror 16, i.e. wedge angle $\theta$, determines the numbers of beam reflections within the two-mirror wedge. The total number of beam reflections on mirror 16, represented herein by N, is related to the initial angle of incidence $\alpha$ and the wedge angle $\theta$ by $$\alpha = (N-1)\theta. \tag{1}$$

The virtual mirror OC', which makes an angle $\alpha = (N-1)\theta$ from 16 or an angle $N\theta$ from 18, lies normal to the incident 8B. The point C' is a virtual image of point C and the line BC' is exactly equal to the zigzag beam path from point B to point C. These multiple relections results in an N-fold enhancement in the sensitivity and resolution of the interferometer where N is the numbers of reflections off the moving mirror 16. Looking closely at the reflections, it can be seen that there are three reflections off mirror 16 until the beam becomes normal to mirror 18 at point C and retraces the same path through the same three reflections off mirror 16 for a total on N=6. The light beam returns from the two-mirror wedge as an equivalent beam from the virtual mirror OC'. A normal displacement $\Delta d$ of mirror 16 to the plane O'B' has the effect of moving the virtual mirror to the plane O'D'. Therefore, a normal displacement $\Delta d$ of mirror 16 from beam 8B causes an optical path change of the reflected beam of 2nC'D', where n is the refractive index of the medium in the vicinity of 16. The n value of air is considered 1 but for measurement of thickness changes of a vapor deposited material on a partially reflective substrate the n value is that of the material being deposited. Noting that $OO' = \Delta d/\sin \theta = C'D'/\sin N\theta$, relationship is established between the optical path change and $\Delta d$. Since the signal that is detected by detecting means, such as a photodetector, goes through one complete cycle for every one $\lambda$ optical path change, the number of cycles represented by m, at the photodetector resulting from the displacement of 16 will be given by $m\lambda = 2n\Delta d \sin N\theta/\sin \theta$. Defining the displacement sensitivity as S the actual displacement of mirror 16 required to produce one complete cycle at the detector is, $$S \equiv \frac{\Delta d}{m} = \frac{\lambda}{2n} / \left(\frac{\sin N\theta}{\sin \theta}\right) \quad (2)$$

Figure 3:
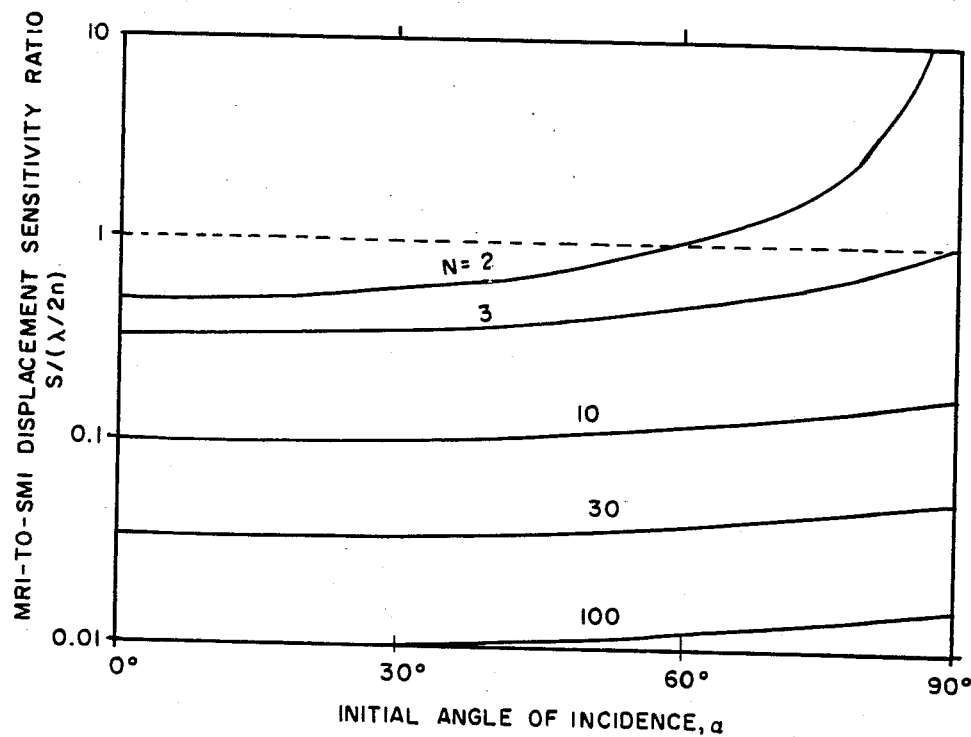
FIG. 3 illustrates displacement sensitivities as a function of initial angle of incidence.

FIG. 3 shows computer plots of sensitivity as a function of $\alpha$ for several values of N. The ordinate is the ratio of MRI sensitivity to SMI sensitivity with the ordinate value 1 representing the SMI sensitivity (dashed line). As expected, MRI shows greater sensitivities than SMI. The only situation where MRI has lower sensitivity is the case of $n=2$ for $\alpha > 60°$ (large incidence angles).

Equation (2) is true for any arbitrary initial angle of incidence. For small angles of incidence, i.e. $\alpha << 1°$, Eq. (2) reduces to the very simple expression, $$S \equiv \frac{\Delta d}{m} = \frac{\lambda}{2nN} \quad (3)$$

Equation (3) shows that the sensitivity of the MRI is a factor N higher than that of the SMI.

Figure 4A:
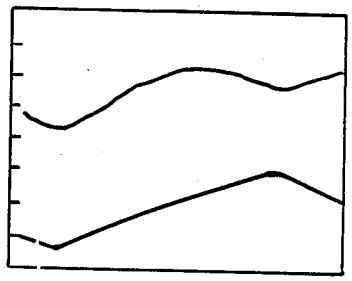
FIGS. 4A, 4B, and 4C shows detector output signals as the upper portion according to mirror movement as shown in the lower portion.
Figure 4B:
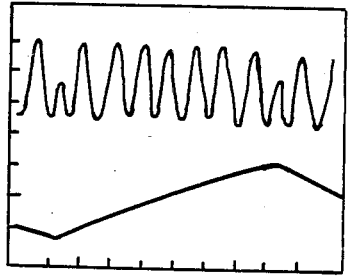
Figure 4C:
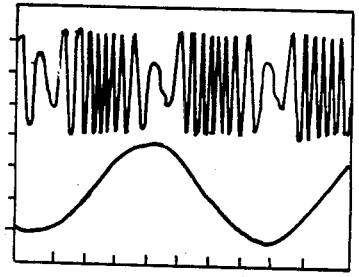

FIGS. 4A, 4B, and 4C illustrate the output wave forms as the upper curves resulting from two input triangular waveforms and a sinusoidal input waveform on the moving mirror 16. A helium-neon laser 10 operating at 633 nanometer wavelength was used with fixed mirror 14 kept normal to the laser beam 8. The beam splitter 12, whose transmission and reflection are partial according to the need for maximum signal at the detector, is positioned at an approximate 45° angle to beam 8 to reflect off component beam 8A to fixed mirror 14 and transmit component 8B into the two-mirror wedge. In FIG. 4A mirror 16 was positioned for normal incidence, i.e. angle $\alpha = 0$ which correspondence to SMI. With the triangular waveform movement applied to mirror 16 the detected signal at photodetector 22 appeared in the upper portion as approximately $\frac{1}{2} \pm \frac{1}{8}$ cycle during the linear ramp, which corresponds to mirror 16 movement of approximately $160 \pm 40$ nanometers. In FIG. 4B mirror 16 was turned to an angle of incidence of $\alpha \sim 3°$ to reflect beam 8B onto fixed mirror 18. Angle $\theta$ was adjusted to provide $N=16$, i.e. a total of 16 reflections off mirrors 16. The exact same triangular waveform motion is applied to mirror 16 as was applied in the situation of FIG. 4A. The detected signal trace now shows approximately $7.5 \pm \frac{1}{8}$ cycles during the linear ramp. Since incident angle $\alpha$ on mirror 16 is very small, Equation (3) can be used to calculate the displacement of mirror 16. Thus for $M = 7.5 \pm 0.13$, the displacement $\Delta d = 148 \pm 3$ nanometer, a value consistent with the one above derived for the SMI arrangement of $\alpha = 0°$ but much more precise. In another test, mirror 18 was tilted to an angle $\theta$ so as to vary N from 2 to 36. At $N=36$, the MRI had a mirror 16 displacement sensitivity of one cycle per $\lambda/72$ or 8.8 nanometers per cycle. FIG. 4C shows the phase modulated signal for $N=20$ which is caused by an approximate 70 nanometer amplitude sinusoidal movement of mirror 16.

The MRI also allows convenient choices in interferometric sensitivities. For example, a displacement sensitivity of exactly 100 nanometers per cycle can be obtained with helium-neon laser in air by choosing the initial angle of incidence $\alpha = 51°$ and $N=4$. A sensitivity of exactly 10 nanometers per cycle can be achieved at $\alpha = 15°$ and $N=32$ or at $\alpha = 43°$ and $N=35$.

It should be noted that mirror 18 must be mounted to remain motionless during the measurements of the displacement of moving mirror 16. Some of the limits of the MRI however are that multiple reflections amplify not only the mirror's displacement motion, but also its angular motion and angular sensitivity may limit the usefulness of the MRI when large mirror motions are encountered.

I claim:

1. An ultra-high sensitivity multiple reflections interferometer of the type that compares light reflected from a fixed length optical path and light reflected from a variable length optical path, said interferometer comprising:

a coherent light source producing a light beam therefrom;

a beam splitter in optical alignment with the coherent light beam, said beam splitter having partial transmission and reflection according to the need for maximum signal detection;

a fixed reflector at the end of the fixed length optical path positioned normal to a reflected portion of said coherent light beam off said beam splitter wherein said fixed reflector reverse-reflects said coherent light beam back to said beam splitter;

an enhanced sensitivity optical path displacement means at the end of the variable length optical path in optical alignment with said coherent light beam and said beam splitter, said optical path displacement means comprised of a two-mirror wedge having a primary moving mirror surface target and a fixed secondary mirror associated therewith to vary the length of the variable length optical path wherein a portion of said coherent light beam transmitted through said beam splitter along said variable length optical path is incident upon said primary mirror of said two-mirror wedge at an angle of incidence $\alpha$ from the normal and is reflected from said primary mirror toward said secondary mirror of said two-mirror wedge in which said secondary mirror is titled at a wedge angle $\theta$ from said primary mirror so that angle $\alpha$ is an integral multiple of angle $\theta$ wherein said incident light beam which strikes said primary mirror at angle $\alpha$ undergoes at least two reflections off said secondary mirror and at least three reflections off said primary mirror in accordance with the established wedge angle $\theta$ between said primary and secondary mirrors and the chosen integral multiple of angle $\alpha$ with respect to angle $\theta$ until said incident light beam becomes normal at one of the primary or secondary mirror surfaces and returns exactly back on itself undergoing the same multiple reflections within said two-mirror wedge wherein the variable length optical path is extended to a representative normal reflection from a virtual image directly behind said primary mirror and wherein said incident light beam reverse-reflects from said two-mirror wedge as an interference signal back to said beam splitter in which the enhanced sensitivity of said interferometer directly proportional to the total number of reflections defined as N that said incident light beam undergoes off said primary moving mirror, wherein the interference signal reverse-reflected from said variable length optical path is combined with the reverse-reflected light beam from said fixed length optical path; and means for detecting the number of detector signal cycles of the combined reverse-reflected light beams wherein one detector signal defines one wavelength $\lambda$ optical path change in said variable length optical path.

2. An interferometer as set forth in claim 1 wherein said moving mirror surface target is a mechanical moving target having inherent reflective characteristics.

3. An interferometer as set forth in claim 1 wherein when said moving mirror surface target is moved a distance of $\Delta d$ the change in the variable optical path length becomes $2\Delta d \cdot \sin N\theta / \sin \theta$ which is approximately $2N\Delta d$ for $\alpha << 1$ radian where N is the total number of reflections of said light beam off said moving mirror surface target and since said means for detecting sees one cycle of signal change for a variable length optical path change of one wavelength $\lambda$ one cycle corresponds to a movement of said moving mirror surface target given as $\Delta d = \lambda/2N$ whereby the interferometer sensitivity increases by a factor of the number of light beam reflections N.

4. An interferometer as set forth in claim 3 wherein a chosen interferometer sensitivity of 10 nanometer per cycle is achieved by an angle of incidence on the primary mirror of $\alpha = 15°$ and the wedge angle $\theta$ is tilted to provide N=32 with the use of a helium-neon laser light source which has a wavelength $\lambda$ of about 633 nanometers.

* * * * *